United States Patent [19]

Marks et al.

[11] Patent Number: 6,011,134

[45] Date of Patent: Jan. 4, 2000

[54] METHOD FOR MANUFACTURING POLY (HEXAMETHYLENE ADIPAMIDE) FROM MONOMETHYLADIPATE AND HEXAMETHYLENEDIAMINE

[75] Inventors: David Neil Marks, Newark, Del.; Samuel Livingston Lane, Beaumont, Tex.

[73] Assignee: E. I. du Pont de Nemours and Company, Wilmington, Del.

[21] Appl. No.: 09/016,385

[22] Filed: Jan. 30, 1998

[51] Int. Cl.[7] .......................... C08G 69/08; C08G 73/10; C08G 69/26

[52] U.S. Cl. .......................... 528/310; 528/322; 528/332; 528/335; 528/336; 528/338; 528/339; 528/347

[58] Field of Search ...................... 528/310, 322, 528/332, 335, 336, 339, 338, 347

[56] References Cited

U.S. PATENT DOCUMENTS

| | | | |
|---|---|---|---|
| 2,071,250 | 2/1937 | Carothers | 528/328 |
| 2,071,251 | 2/1937 | Carothers | 18/54 |
| 2,071,253 | 2/1937 | Carothers | 528/310 |
| 2,130,523 | 9/1938 | Carothers | 528/310 |
| 2,130,948 | 9/1938 | Carothers | 18/54 |
| 2,158,064 | 5/1939 | Carothers | 528/337 |
| 2,188,332 | 1/1940 | Carothers | 91/68 |
| 2,190,770 | 2/1940 | Carothers | 524/37 |
| 2,191,556 | 2/1940 | Carothers | 528/335 |
| 2,252,554 | 8/1941 | Carothers | 528/338 |
| 3,454,536 | 7/1969 | Schade et al. | 528/347 |
| 3,607,840 | 9/1971 | Yura et al. | 528/335 |
| 4,076,948 | 2/1978 | Mims | 560/191 |
| 4,082,788 | 4/1978 | Mims | 558/443 |
| 4,537,987 | 8/1985 | Schneider et al. | 560/193 |
| 4,931,590 | 6/1990 | Kummer et al. | 562/590 |
| 5,162,491 | 11/1992 | Hammond, Jr. et al. | 528/349 |
| 5,686,556 | 11/1997 | Jouffret et al. | 528/310 |

FOREIGN PATENT DOCUMENTS

| | | | |
|---|---|---|---|
| 57-80426 | 5/1982 | Japan | C08G 69/28 |
| 303867 | 3/1930 | United Kingdom . | |
| 1053100 | 12/1966 | United Kingdom | C08G 19/00 |

*Primary Examiner*—P. Hampton-Hightower

[57] ABSTRACT

An improved method for manufacturing poly (hexamethylene adipamide), i.e. nylon 6,6, by reacting monomethyl adipate with hexamethylenediamine in an approximately equimolar ratio in the presence of water at a temperature of 100 to 165° C. while simultaneous distilling off of a stoichiometric amount of methanol. The resulting aqueous intermediate product is then heated to 200 to 260° C. while distilling off substantially all water at a pressure of 150 to 250 psig ($1.03 \times 10^6$ to $1.72 \times 10^6$ Pa) followed by reducing the pressure to atmospheric pressure and increasing the temperature to 270 to 280° C. to polycondense the distillate residue. Such a process is useful in producing high purity commercial grade poly(hexamethylene adipamide) that advantageously avoids problems caused by N-methylation of the polyamide.

3 Claims, No Drawings

METHOD FOR MANUFACTURING POLY (HEXAMETHYLENE ADIPAMIDE) FROM MONOMETHYLADIPATE AND HEXAMETHYLENEDIAMINE

BACKGROUND OF THE INVENTION

1. Field of the Invention:

The present invention relates to an improved method of manufacturing poly(hexamethylene adipamide), i.e. nylon 6,6, by reacting monomethyl adipate with hexamethylenediamine. More specifically but not by way of limitation, the invention relates to a process wherein methanol is removed at an early stage prior to polycondensation thus producing poly (hexamethylene adipamide) characterized as having a relative viscosity of from about 20 to about 100 (measured at 8.4 wt % polyamide in 90/10 wt % formic acid/water @ 25° C.) and further characterized as containing less than 50 moles N-methylhexamethylenediamine per million grams polyamide.

2. Description of the Related Art:

Polyamides are generally prepared from salts of a diamine and dicarboxylic acid or by reaction of a diamine and a dicarboxylic acid diester. An example of the latter process is described in Yura et al. U.S. Pat. No. 3,607,840 which discloses a process for making nylon by reacting a lower alkyl diester of adipic acid with hexamethylenediamine in the presence of 20 to 70 wt % water at a temperature of less than 100° C. while removing the alkanol via distillation to form an aqueous solution of the salt hexamethylene diammonium adipate. The resulting aqueous solution is heated to a temperature sufficient to remove the water followed by polymerizing the salt to form nylon 6,6 polymer. Heintzeler et al. in GB 1,053,100 discloses the reaction of diesters of adipic acid with hexamethylene diamine in the presence of 1 to 50 wt % water. In the disclosed process, it is not necessary to work under superatmospheric or subatmospheric pressure. Takahashi et al. in Japanese application JP 57-80426 discloses a process for preparing polyamides from hexamethylenediamine and the dimethyl ester of a dicarboxylic acid by reacting at a temperature of 120 to 150° C. while maintaining the water concentration at 40 to 90 wt % in a sealed system until essentially all of the starting materials have reacted, removing the methanol after essentially all of the starting materials have reacted, and then polymerizing. The initial reaction is conducted in a sealed system to avoid loss of the starting materials with escaping methanol. However, heating in a sealed system leads to reaction of methanol with an amine resulting in N-methylated amine. N-methylation interferes with polymer crystallization and N-methylated amine ends are less reactive for polyamidation resulting in reduced molecular weight.

In U.S. Pat. No. 3,454,536 the above problem associated with secondary reactions and specifically the undesirable N-methylamino by-products are acknowledged. The disclosure teaches that such by-products noticeably influence the properties of the end products if they are present in a concentration of above approximately 2 mole percent, relative to the number of carbonamide groups present in the polyamide. A process for preparing polyamide from a dimethyl ester of an aromatic dicarboxylic acid and a diamine is disclosed wherein a preliminary condensate is formed in the presence of water at 90 to 100° C. with simultaneous distilling off of resultant methanol-water mixture to the point of removing substantially all of the methanol formed in the reaction. This step is followed by polycondensing the distillation residue at 250 to 290° C. to form the desired polyamide.

Preparation of the monomethyl ester of adipic acid, monomethyl adipate, is described in Schneider et al. U.S. Pat. No. 4,537,987. The adipic monoesters are described therein as being useful for the preparation of sebacates by Kolbe synthesis. Monomethyl adipate can be hydrolyzed to form adipic acid for use as a starting material for polyamides, as described in Kummer et al. U.S. Pat. No. 4,931,590. The isolation of adipic acid requires additional steps of crystallization and drying, resulting in additional costs. It would therefore be desirable to react monomethyl adipate directly in a nylon polymerization process.

BRIEF SUMMARY OF THE INVENTION

The current invention provides a process for producing poly(hexamethylene adipamide) by reacting hexamethylenediamine and monomethyl adipate. According to the present invention, it has now been discovered that concentrations of N-methylated groups in the polymer chain (analyzed as N-methylhexamethylenediamine) greater than 50 moles per million grams (mpmg) of polyamide result in poor polymer quality. The nylon 6,6 formed by the process of the current invention has a concentration of N-methylated groups in the polymer of less than 50 mpmg.

Thus the present invention provides a method for preparing poly(hexamethylene adipamide) comprising the steps of:

(a) reacting monomethyl adipate and hexamethylenediamine in an approximately equimolar ratio in the presence of water at a temperature of 100 to 165° C. while simultaneous distilling off methanol and water for a time sufficient to remove at least 90 mole % of the theoretical stoichiometric amount of methanol;

(b) heating the aqueous reaction product of step (a) to 200 to 260° C. while distilling off substantially all water at a pressure of 100 to 250 psig (6.89 ×10$^5$ to 1.72 ×10$^6$ Pa) followed by reducing the pressure to atmospheric pressure and increasing the temperature to 270 to 280° C. to polycondense the distillate residue; and (c) recovering poly(hexamethylene adipamide) having a relative viscosity of 20 to 100 (preferably 40 to 70), measured at 8.4 wt % polyamide in 90/10 wt % formic acid/water @ 25° C., and a concentration of N-methylated groups in the polyamide, analyzed as N-methylhexamethylenediamine, of less than 50 moles per million grams of polyamide.

In view of the above mentioned problems associated with producing nylon 6,6 it is an object of the present invention to provide an improved method of manufacturing poly (hexamethylene adipamide) directly from hexamethylenediamine and monomethyl adipate. It is a further object that the poly(hexamethylene adipamide) be characterized as having a relative viscosity of 20 to 100 when measured at 8.4 wt % polyamide in 90/10 wt % formic acid/water @ 25° C. and as having a concentration of N-methylated groups in the polyamide when analyzed as N-methylhexamethylenediamine of less than 50 moles of N-methylated groups per million grams of polyamide. Fulfillment of these objects and the presence and fulfillment of additional objects will become apparent upon complete reading of the specification and attached claims.

DETAILED DESCRIPTION OF THE INVENTION

The process of the current invention can be viewed as being carried out in two steps. In the first step, approximately equimolar quantities of hexamethylenediamine and monomethyl adipate are reacted in the presence of water. Preferably, 10 . 50 wt % water based on the total weight of reactants and water is used. At least 10 wt % water is used in order to efficiently purge the methanol out of the system as it is formed and to minimize the reaction of methanol with the hexamethylenediamine to form N-methylhexamethylenediamine. Quantities of water greater than 50 wt % can be used, however additional water results in no added benefit. The reaction is conducted at temperatures of 100 to 165° C., preferably 120 to 150° C., at pressures that allow for removal of the methanol as it is formed while retaining a majority of the water. Generally the pressure is selected to be between slightly below and slightly above the pressure at which water boils at the chosen temperature. Temperatures greater than about 165° C. result in the formation of undesirably high concentrations of N-methylhexamethylenediamine. For example, the reaction can be carried out under pressure in an autoclave equipped to provide for continuous venting of the methanol or alternatively under reflux conditions at atmospheric pressure while removing the methanol as it is formed by distillation. A slight excess of diamine may be used, less than 1 mole percent, to compensate for small amounts of diamine which can be lost from the system with the methanol that is removed. It is believed that the product of the first reaction step is primarily the salt of $HOOC(CH_2)_4CONH(CH_2)_6NH_2$, which results from reaction of the ester end of monomethyl adipate and an amine end of hexamethylene diamine in the presence of water. At higher temperatures, for example greater than 150° C., oligomers resulting from further reaction of acid and amine ends also form.

After an approximately stoichiometric amount of methanol (generally at least about 90 mole % of the theoretical amount) has been removed in the first step, the aqueous reaction product containing 10 to 50 wt % water is polymerized to nylon 6,6 using standard high pressure polymerization methods. Pressures above atmospheric pressure are used to keep the product in a liquid state and thus avoid freezing the polymer. The aqueous product from the first step will solidify if water is removed at too low a temperature. It is important to retain sufficient water during the first step to allow for purging of the remaining methanol once the material is molten during the polycondensation reaction. For example, polycondensation can be carried out by heating the aqueous reaction product from the first step to 200 to 260° C. while venting water and methanol at a pressure of 100 to 250 psig, ($6.89 \times 10^5$ to $1.72 \times 10^6$ Pa) gradually reducing the pressure to atmospheric pressure while increasing the temperature further to 270 to 280° C. Polycondensation is continued at atmospheric or subatmospheric pressure and elevated temperature for 10 to 45 minutes to obtain nylon 6,6 having a relative viscosity of 20 to 100, preferably 40 to 70, and a concentration of N-methylated groups, analyzed as N-methylhexamethylenediamine, of less than 50 mpmg.

The method of manufacturing poly(hexamethylene adipamide) according to the present invention can be performed in a batch mood or a continuous polymerization mode as generally known in the art. Preferably a commercial scale operation is to be performed in a continuous manner with the removal of methanol at low pressure and temperature during the first reaction stage in the presence of water followed by removal of water at elevated temperature and pressure and ultimately polycondensation to high molecular weight polymer at high temperature.

The following examples are presented to more fully demonstrate and further illustrate various aspects and features of the present invention and verify advantages of the present invention. As such the examples are felt to be non-limiting and are meant to illustrate the invention but are not meant to be unduly limiting in any way particularly with respect to ultimate properties of the polyamide product and utility of the claimed improved process. The relative viscosity (RV) in the following examples was measured as the ratio of the time that it takes for a solution of 8.4 wt % polyamide in 90 wt % formic acid and 10 wt % water at 25° C. to pass through a capillary viscometer relative to the time that it takes for the 90 wt % formic acid and 10 wt % water at 25° C. to pass through the capillary viscometer. The relative amount of N-methylhexamethylenediamine present in the polyamide was determined by depolymerizing and recovering and measuring the amount of N-methylhexamethylenediamine produced. The analytical procedure involved placing 0.25 grams of polyamide polymer into a glass hydrolysis tube (19 mm outer diameter and 100 mm long). A pipette was used to transfer 3 mL of 8 N hydrochloric acid into the tube. Air was removed from the tube by applying a vacuum for 15 seconds. The tube was capped and heated in an aluminum block at 115° C. for 16 hours. The tube was uncapped and 3 mL of 13 N sodium hydroxide was added slowly. The contents of the tube was mixed and cooled to room temperature. Two (2) mL of toluene containing 0.002 N laurylamine was added to the tube. The mixture was shaken and the layers were allowed to separate. A portion of the top layer was removed and transferred to a 2 mL autosampler vial. The solution was analyzed on a DB-5 capillary column using a Hewlett-Packard 5890 gas chromatograph. The content of N-methylhexamethylenediamine in the polyamide polymer was calculated from its peak area relative to that of the internal standard (laurylamine).

EXAMPLE I

A 300 cc electrically-heated autoclave was charged with 32.5 grams of monomethyl adipate, 23.6 grams of hexamethylenediamine and 35 grams of water. A Kammer 80,000 Series pressure control valve (PCV), commercially available from Kammer (Pittsburgh, Pa.) was set to control the pressure at 40 psig ($2.76 \times 10^5$ Pa) and the autoclave was pressurized with 20 psig ($1.38 \times 10^5$ Pa) nitrogen. The line between the autoclave and the PCV was heated to 125° C. The contents of the reactor were agitated at 600 rpm and heated to 130° C. over about 40 minutes. The temperature was held at 130° C. for 60 minutes. The pressure in the system was reduced until 12 grams of off-gas condensate was collected. This required 10 minutes and pressure reduction to 20 psig ($1.38 \times 10^5$ Pa).

The PCV was reset for 250 psig ($1.72 \times 10^6$ Pa) and the contents of the autoclave were heated to 250° C. in about 20 minutes. After reaching 250° C., the pressure in the system was reduced to atmospheric over one hour while increasing the temperature to 275° C. The reactor was heated at 275° C. and atmospheric pressure for 45 minutes. The agitator and heat were turned off. After cooling to less than 100° C. the polymer was removed from the autoclave as a block attached to the agitator. The block was cooled in liquid nitrogen, chipped off of the agitator and milled. The product had a relative viscosity in 90% formic acid of 53. The product was hydrolyzed in hydrochloric acid and the amine-containing components were analyzed by gas chromatography. The product contained 16 moles of N-methylhexamethylenediamine per million grams of polymer. This is the product of reaction of methanol and hexamethylenediamine.

EXAMPLE II

The autoclave described in Example I was charged with 32.5 grams of monomethyl adipate, 23.7 grams of hexamethylenediamine and 35 grams of water. The PCV was set at 100 psig (6.89 ×10$^5$ Pa) and the autoclave was pressurized with 20 psig (1.38 ×10$^5$ Pa) nitrogen. The line between the autoclave and the PCV was heated to 145° C. The contents of the reactor were agitated at 600 rpm and heated to 150° C. over about 30 minutes. The temperature was held at 150° C. for 60 minutes. The pressure in the system was reduced until 12 grams of off-gas condensate was collected. This required 20 minutes and pressure reduction to 50 psig (3.45 ×10$^5$ Pa).

The PCV was reset for 250 psig (1.72 ×10$^6$ Pa) and the contents of the autoclave were heated to 250° C. in about 20 minutes. After reaching 250° C., the pressure in the system was reduced to atmospheric over one hour while increasing the temperature to 275° C. The reactor was heated at 275° C. and atmospheric pressure for 45 minutes. The agitator and heat were turned off. After cooling to less than 100° C. the polymer was removed from the autoclave as a block attached to the agitator. The block was cooled in liquid nitrogen, chipped off of the agitator and milled. The product had a relative viscosity in 90% formic acid of 50. The product was hydrolyzed in hydrochloric acid and the amine-containing components were analyzed by gas chromatography. The product contained 30 moles of N-methylhexamethylenediamine per million grams of polymer.

EXAMPLE III

A flask was charged with 39.1 grams of monomethyl adipate, 28.4 grams of hexamethylenediamine and 54 grams of water. The flask was magnetically stirred and had a short distillation head on top. The contents of the flask were heated quickly to reflux (about 100° C.) and held there for 140 minutes. During this period methanol distilled from the flask at 65° C. One hundred grams of the hot solution from the flask were transferred to the autoclave described in Example I.

The PCV was set for 250 psig (1.72 ×10$^6$ Pa) and 20 psig (1.38 ×10$^5$ Pa) nitrogen was put on the autoclave. The agitator was set at 600 rpm. The contents of the autoclave were heated to 250° C. in about 50 minutes. After reaching 250° C., the pressure in the system was reduced to atmospheric over one hour while increasing the temperature to 275° C. The reactor was heated at 275° C. and atmospheric pressure for 45 minutes then the agitator and heat were turned off. After cooling to less than 100° C the polymer was removed from the autoclave as a block attached to the agitator. The block was cooled in liquid nitrogen, chipped off of the agitator and milled. The product had a relative viscosity in 90% formic acid of 64. The product was hydrolyzed in hydrochloric acid and the amine-containing components were analyzed by gas chromatography. The product contained 10 moles of N-methylhexamethylenediamine per million grams of polymer.

EXAMPLE IV

A flask was charged with 39.1 grams of monomethyl adipate, 28.4 grams of hexamethylenediamine and 54 grams of water. The flask was magnetically stirred and had a short distillation head on top. The contents of the flask were heated quickly to reflux (about 100° C.) and held there for 240 minutes. During this period methanol distilled from the flask at 65° C. One hundred grams of this solution were transferred to the autoclave described in Example I.

The PCV was set for 250 psig (1.72 ×10$^6$ Pa) and 20 psig (1.38 ×10$^5$ Pa) nitrogen was put on the autoclave. The agitator was set at 600 rpm. The contents of the autoclave were heated to 250° C. in about 60 minutes. After reaching 250° C., the pressure in the system was reduced to atmospheric over one hour while increasing the temperature to 275° C. The reactor was heated at 275° C. and atmospheric pressure for 45 minutes then the agitator and heat were turned off. After cooling to less than 100° C. the polymer was removed from the autoclave as a block attached to the agitator. The block was cooled in liquid nitrogen, chipped off of the agitator and milled. The product had a relative viscosity in 90% formic acid of 66. The product was hydrolyzed in hydrochloric acid and the amine-containing components were analyzed by gas chromatography. The product contained 9 moles of N-methylhexamethylenediamine per million grams of polymer.

EXAMPLE V

The autoclave described in Example I was charged with 32.5 grams of monomethyl adipate, 23.6 grams of hexamethylenediamine and 35 grams of water. The PCV was set at 70 psig (4.83 ×10$^5$ Pa) and the autoclave was pressurized with 20 psig (1.38 ×10$^5$ Pa) nitrogen. The line between the autoclave and the PCV was heated to 145° C. The contents of the reactor were agitated at 600 rpm and heated to 150° C. over about 30 minutes. The temperature was held at 150° C. for 60 minutes. The pressure in the system was reduced until 12 grams of off-gas condensate was collected. This required 20 minutes and pressure reduction to 50 psig (3.45 ×10$^5$ Pa).

The PCV was reset for 250 psig (1.72 ×10$^6$ Pa) and the contents of the autoclave were heated to 250° C. in about 20 minutes. After reaching 250° C., the pressure in the system was reduced to atmospheric over one hour while increasing the temperature to 275° C. The reactor was heated at 275° C. and atmospheric pressure for 45 minutes. The agitator and heat were turned off. After cooling to less than 100° C. the polymer was removed from the autoclave as a block attached to the agitator. The block was cooled in liquid nitrogen, chipped off of the agitator and milled. The product had a relative viscosity in 90% formic acid of 66. The product was hydrolyzed in hydrochloric acid and the amine-containing components were analyzed by gas chromatography. The product contained 32 moles of N-methylhexamethylenediamine per million grams of polymer.

EXAMPLE VI

The autoclave described in Example I was charged with 32.5 grams of monomethyl adipate, 23.6 grams of hexamethylenediamine and 35 grams of water. The PCV was set at 100 psig (6.89 ×10$^5$ Pa) and the autoclave was pressurized with 20 psig (1.38 ×10$^5$ Pa) nitrogen. The line between the autoclave and the PCV was heated to 145° C. The contents of the reactor were agitated at 600 rpm and heated to 150° C. over about 30 minutes. The temperature was held at 150° C. for 60 minutes. With the PCV set at 100 psig, (6.89 ×10$^5$ Pa) the contents of the autoclave were heated to 250° C. in about 30 minutes.

After reaching 250° C., the pressure in the system was reduced to atmospheric over one hour while increasing the temperature to 275° C. The reactor was heated at 275° C. and atmospheric pressure for 45 minutes. The agitator and heat were turned off. After cooling to less than 100° C. the polymer was removed from the autoclave as a block attached to the agitator. The block was cooled in liquid nitrogen, chipped off of the agitator and milled. The product had a relative viscosity in 90% formic acid of 60. The product was hydrolyzed in hydrochloric acid and the amine-containing components were analyzed by gas chromatography. The product contained 24 moles of N-methylhexamethylenediamine per million grams of polymer.

COMPARATIVE EXAMPLE A

The autoclave described in Example I was charged with 32.5 grams of monomethyl adipate, 23.6 grams of hexamethylenediamine and 35 grams of water. The PCV was set at 120 psig ($8.27 \times 10^5$ Pa) and the autoclave was pressurized with 20 psig ($1.38 \times 10^5$ Pa) nitrogen. The line between the autoclave and the PCV was heated to 165° C. The contents of the reactor were agitated at 600 rpm and heated to 170° C. over about 30 minutes. The temperature was held at 170° C. for 60 minutes. The pressure in the system was reduced until 12 grams of off-gas condensate was collected. This required 15 minutes and pressure reduction to 95 psig ($6.51 \times 10^5$ Pa).

The PCV was reset for 250 psig ($1.72 \times 10^6$ Pa) and the contents of the autoclave were heated to 250° C. in about 20 minutes. After reaching 250° C., the pressure in the system was reduced to atmospheric over one hour while increasing the temperature to 275° C. The reactor was heated at 275° C. and atmospheric pressure for 45 minutes. The agitator and heat were turned off. After cooling to less than 100° C. the polymer was removed from the autoclave as a block attached to the agitator. The block was cooled in liquid nitrogen, chipped off of the agitator and milled. The product had a relative viscosity in 90% formic acid of 53. The product was hydrolyzed in hydrochloric acid and the amine-containing components were analyzed by gas chromatography. The product contained 57 moles of N-methylhexamethylene-diamine per million grams of polymer.

Having thus described and exemplified the invention with a certain degree of particularity, it should be appreciated that the following claims are not to be so limited but are to be afforded a scope commensurate with the wording of each element of the claim and equivalents thereof.

We claim:

1. A method for preparing poly(hexamethylene adipamide) comprising the steps of:

(a) reacting monomethyl adipate and hexamethylenediamine in an approximately equimolar ratio in the presence of water at a temperature of 100 to 165° C. while simultaneous distilling off methanol and water for a time sufficient to remove at least 90 mole % of the theoretical stoichiometric amount of methanol;

(b) heating the aqueous reaction product of step (a) to 200 to 260° C. while distilling off substantially all water at a pressure of 100 to 250 psig ($6.89 \times 10^5$ to $1.72 \times 10^6$ Pa) followed by reducing the pressure to atmospheric pressure and increasing the temperature to 270 to 280° C. to polycondense the distillate residue; and (c) recovering poly(hexamethylene adipamide) having a relative viscosity of 20 to 100, measured at 8.4 wt % polyamide in 90/10 wt % formic acid/water @ 25° C., and a concentration of N-methylated groups in the polyamide, analyzed as N-methylhexamethylenediamine, of less than 50 moles per million grams of polyamide.

2. The method of claim 1 wherein said reacting monomethyl adipate and hexamethylenediamine in an approximately equimolar ratio in the presence of water is at a temperature of 120 to 150° C.

3. The method of claim 1 wherein said poly(hexamethylene adipamide) being recovered has a relative viscosity of 20 to 100.

* * * * *